US008904270B2

(12) United States Patent
Bouchard et al.

(10) Patent No.: US 8,904,270 B2
(45) Date of Patent: Dec. 2, 2014

(54) METHODS AND APPARATUS FOR ENTERPRISE DOCUMENT DISTRIBUTION

(75) Inventors: Thaddeus Bouchard, Andover, MA (US); Robert L. Voelk, Harvard, MA (US)

(73) Assignee: Omtool Ltd., Andover, MA (US)

( * ) Notice: Subject to any disclaimer, the term of this patent is extended or adjusted under 35 U.S.C. 154(b) by 1058 days.

(21) Appl. No.: 11/564,645

(22) Filed: Nov. 29, 2006

(65) Prior Publication Data

US 2008/0126513 A1 May 29, 2008

(51) Int. Cl.
*G06Q 10/10* (2012.01)
*G06F 17/30* (2006.01)

(52) U.S. Cl.
CPC .......... *G06F 17/30011* (2013.01); *G06Q 10/10* (2013.01)
USPC ............................ 715/202; 715/200; 715/201

(58) Field of Classification Search
USPC ................................................. 715/200–202
See application file for complete search history.

(56) References Cited

U.S. PATENT DOCUMENTS

| 4,392,021 A | 7/1983 | Slate |
| 4,958,235 A | 9/1990 | Sims et al. |
| 4,974,254 A | 11/1990 | Perine et al. |
| 4,985,919 A | 1/1991 | Naruse et al. |
| 4,994,926 A | 2/1991 | Gordon et al. |
| 5,155,601 A | 10/1992 | Toyama |
| 5,166,977 A | 11/1992 | Ross |
| 5,168,376 A | 12/1992 | Motohama |
| 5,202,920 A | 4/1993 | Takahashi |
| 5,255,106 A | 10/1993 | Castro |
| 5,287,199 A | 2/1994 | Zoccolillo |
| 5,291,302 A | 3/1994 | Gordon et al. |
| 5,339,174 A | 8/1994 | Harris |
| 5,339,361 A | 8/1994 | Schwalm et al. |
| 5,404,231 A | 4/1995 | Bloomfield |
| 5,417,488 A | 5/1995 | Horton |
| 5,452,099 A | 9/1995 | Von Meister |
| 5,459,584 A | 10/1995 | Gordon et al. |
| 5,465,300 A | 11/1995 | Altschuler et al. |

(Continued)

FOREIGN PATENT DOCUMENTS

| CA | 1329852 C | 5/1994 |
| CA | 2189211 A1 | 3/1998 |

(Continued)

OTHER PUBLICATIONS

FlowPort User Guide; Aug. 2000; Xerox Corporation; pp. 2-4, 3-10, 4-3, 4-6, 5-3, 5-4, 5-5, 5-18, and 5-38.*

(Continued)

*Primary Examiner* — Andrew Dyer
(74) *Attorney, Agent, or Firm* — Choate, Hall & Stewart, LLP; William R. Haulbrook (57) ABSTRACT

The invention provides, in some aspects, methods for electronic document distribution that permit automatic transmittal of a set of documents to one or more recipients. The set includes documents pre-existing at the time the distribution is specified, as well as at least one that is subsequently created. Such "mixed-mode" distribution can be used, for example, to effect automatic distribution of pre-existing word processing documents (or spreadsheets, etc.), along with a newly scanned document, e.g., a hand-written note. Distribution of the documents is triggered by creation of the latter document—in this example, the scanned hand-written note.

17 Claims, 4 Drawing Sheets

(56) References Cited

U.S. PATENT DOCUMENTS

| | | |
|---|---|---|
| 5,530,755 A | 6/1996 | Pailles |
| 5,535,277 A | 7/1996 | Shibata et al. |
| 5,539,530 A | 7/1996 | Reifman et al. |
| 5,552,897 A | 9/1996 | Mandelbaum et al. |
| 5,553,145 A | 9/1996 | Micali |
| 5,555,307 A | 9/1996 | Le Corre et al. |
| 5,587,809 A | 12/1996 | Le Corre et al. |
| 5,590,196 A | 12/1996 | Moreau |
| 5,615,269 A | 3/1997 | Micali |
| 5,621,539 A | 4/1997 | Brown et al. |
| 5,629,982 A | 5/1997 | Micali |
| 5,666,420 A | 9/1997 | Micali |
| 5,671,285 A | 9/1997 | Newman |
| 5,673,316 A | 9/1997 | Auerbach et al. |
| 5,771,101 A | 6/1998 | Bramall |
| 5,790,665 A | 8/1998 | Micali |
| 5,805,719 A | 9/1998 | Pare et al. |
| 5,812,670 A | 9/1998 | Micali |
| 5,835,726 A | 11/1998 | Shwed et al. |
| 5,859,967 A | 1/1999 | Kaufeld et al. |
| 5,903,721 A | 5/1999 | Sixtus |
| 5,909,289 A | 6/1999 | Shibata et al. |
| 5,982,505 A | 11/1999 | Jeon |
| 6,011,847 A | 1/2000 | Follendore, III |
| 6,014,228 A | 1/2000 | Castro |
| 6,014,631 A | 1/2000 | Teagarden et al. |
| 6,023,345 A * | 2/2000 | Bloomfield .................. 358/402 |
| 6,073,118 A | 6/2000 | Gormish et al. |
| 6,134,326 A | 10/2000 | Micali |
| 6,137,884 A | 10/2000 | Micali |
| 6,141,750 A | 10/2000 | Micali |
| 6,148,301 A * | 11/2000 | Rosenthal ...................... 707/10 |
| 6,157,706 A | 12/2000 | Rachelson |
| 6,161,181 A | 12/2000 | Haynes, III et al. |
| 6,182,118 B1 | 1/2001 | Finney et al. |
| 6,192,165 B1 | 2/2001 | Irons |
| 6,192,407 B1 | 2/2001 | Smith et al. |
| 6,266,159 B1 | 7/2001 | Otsuka et al. |
| 6,427,032 B1 | 7/2002 | Irons et al. |
| 6,430,691 B1 | 8/2002 | Di Santo et al. |
| 6,470,086 B1 | 10/2002 | Smith |
| 6,487,599 B1 | 11/2002 | Smith et al. |
| 6,570,667 B1 | 5/2003 | Hattori et al. |
| 6,594,032 B1 | 7/2003 | Hiroki et al. |
| 6,609,196 B1 | 8/2003 | Dickinson, III et al. |
| 6,625,642 B1 | 9/2003 | Naylor et al. |
| 6,670,537 B2 * | 12/2003 | Hughes et al. .................. 84/609 |
| 6,744,761 B1 | 6/2004 | Neumann et al. |
| 6,744,936 B2 | 6/2004 | Irons et al. |
| 6,760,752 B1 | 7/2004 | Liu et al. |
| 6,867,876 B1 * | 3/2005 | Czyszczewski et al. ..... 358/1.15 |
| 6,889,321 B1 | 5/2005 | Kung et al. |
| 6,952,281 B1 | 10/2005 | Irons et al. |
| 6,977,740 B1 | 12/2005 | Mandalia |
| 6,981,023 B1 | 12/2005 | Hamilton et al. |
| 7,020,843 B2 | 3/2006 | Hamlett et al. |
| 7,050,188 B1 | 5/2006 | Yajima et al. |
| 7,080,409 B2 | 7/2006 | Eigeles |
| 7,082,538 B2 | 7/2006 | Bouchard et al. |
| 7,116,433 B1 | 10/2006 | Toyoda |
| 7,151,834 B1 | 12/2006 | Cannon et al. |
| 7,168,036 B2 | 1/2007 | Klotz, Jr. et al. |
| 7,283,270 B2 | 10/2007 | Boire-Lavigne et al. |
| 7,308,477 B1 | 12/2007 | Gress et al. |
| 7,463,377 B2 | 12/2008 | Aoki |
| 7,596,691 B2 | 9/2009 | Koue et al. |
| 7,631,193 B1 | 12/2009 | Hoffman |
| 8,045,203 B2 | 10/2011 | Henry et al. |
| 8,174,712 B2 * | 5/2012 | Richardson et al. ......... 358/1.15 |
| 2001/0034739 A1 * | 10/2001 | Anecki et al. ................ 707/500 |
| 2002/0002675 A1 | 1/2002 | Bush |
| 2002/0007453 A1 | 1/2002 | Nemovicher |
| 2002/0049618 A1 | 4/2002 | McClure et al. |
| 2002/0054334 A1 | 5/2002 | Harrison et al. |
| 2002/0055909 A1 | 5/2002 | Fung et al. |
| 2002/0078052 A1 * | 6/2002 | Cheng ............................ 707/10 |
| 2002/0087861 A1 | 7/2002 | Segev et al. |
| 2002/0091928 A1 | 7/2002 | Bouchard et al. |
| 2002/0093674 A1 | 7/2002 | Ferlitsch et al. |
| 2002/0099938 A1 | 7/2002 | Spitz |
| 2002/0138547 A1 * | 9/2002 | Cherry et al. ................. 709/201 |
| 2002/0157028 A1 | 10/2002 | Koue et al. |
| 2003/0031341 A1 | 2/2003 | Rhoads |
| 2003/0043403 A1 | 3/2003 | Tashima |
| 2003/0046363 A1 | 3/2003 | Ezato |
| 2003/0058478 A1 | 3/2003 | Aoki |
| 2003/0065623 A1 | 4/2003 | Corneil et al. |
| 2003/0070074 A1 | 4/2003 | Geller et al. |
| 2003/0086124 A1 | 5/2003 | Parry |
| 2003/0095289 A1 | 5/2003 | Mitani |
| 2003/0099336 A1 | 5/2003 | Speeney et al. |
| 2003/0105725 A1 | 6/2003 | Hoffman |
| 2003/0115448 A1 | 6/2003 | Bouchard |
| 2003/0120729 A1 * | 6/2003 | Kim et al. ..................... 709/203 |
| 2003/0163431 A1 | 8/2003 | Ginter et al. |
| 2003/0163529 A1 | 8/2003 | Yamaguchi |
| 2003/0163552 A1 * | 8/2003 | Savitzky et al. .............. 709/219 |
| 2003/0164986 A1 | 9/2003 | Boire-Lavigne et al. |
| 2003/0217034 A1 * | 11/2003 | Shutt .................................. 707/1 |
| 2004/0015779 A1 | 1/2004 | Shorter |
| 2004/0023656 A1 | 2/2004 | Purdy et al. |
| 2004/0042034 A1 * | 3/2004 | Tiffan et al. ................. 358/1.15 |
| 2004/0073613 A1 | 4/2004 | Plewnia |
| 2004/0111375 A1 | 6/2004 | Johnson |
| 2004/0111644 A1 | 6/2004 | Saunders et al. |
| 2004/0125396 A1 | 7/2004 | Burke |
| 2004/0158733 A1 | 8/2004 | Bouchard |
| 2004/0184092 A1 * | 9/2004 | Ogawa ......................... 358/1.15 |
| 2004/0205137 A1 * | 10/2004 | Chen et al. .................... 709/206 |
| 2004/0205616 A1 | 10/2004 | Rosenberg et al. |
| 2004/0230807 A1 | 11/2004 | Baird et al. |
| 2004/0267876 A1 | 12/2004 | Kakivaya et al. |
| 2005/0055337 A1 | 3/2005 | Bebo et al. |
| 2005/0097046 A1 | 5/2005 | Singfield |
| 2005/0097171 A1 | 5/2005 | Hikichi |
| 2005/0102354 A1 | 5/2005 | Hollenbeck et al. |
| 2005/0125319 A1 | 6/2005 | Johnson |
| 2005/0131815 A1 | 6/2005 | Fung et al. |
| 2005/0182656 A1 | 8/2005 | Morey |
| 2005/0195447 A1 | 9/2005 | Os |
| 2005/0225791 A1 | 10/2005 | Lee |
| 2005/0257247 A1 | 11/2005 | Moriconi et al. |
| 2006/0028689 A1 | 2/2006 | Perry et al. |
| 2006/0036394 A1 * | 2/2006 | Chen et al. .................... 702/123 |
| 2006/0064389 A1 | 3/2006 | Doll-Steinberg |
| 2006/0293989 A1 | 12/2006 | Morrison et al. |
| 2007/0013960 A9 | 1/2007 | Gordon et al. |
| 2007/0112854 A1 * | 5/2007 | Franca ........................ 707/104.1 |
| 2007/0180032 A1 * | 8/2007 | Pearson ....................... 709/206 |
| 2007/0208875 A1 | 9/2007 | Plewnia |
| 2007/0208931 A1 | 9/2007 | Koue et al. |
| 2008/0007793 A1 | 1/2008 | Filbrich et al. |
| 2008/0123124 A1 | 5/2008 | Smithson |
| 2008/0126513 A1 | 5/2008 | Bouchard et al. |
| 2008/0147506 A1 | 6/2008 | Ling |
| 2009/0164781 A1 | 6/2009 | Bouchard |
| 2009/0178111 A1 | 7/2009 | Moriconi et al. |
| 2009/0290692 A1 | 11/2009 | Fong et al. |
| 2010/0290087 A1 | 11/2010 | Van Hoof et al. |
| 2011/0216889 A1 | 9/2011 | Howell et al. |

FOREIGN PATENT DOCUMENTS

| | | |
|---|---|---|
| EP | 1 234 253 B1 | 1/2007 |
| WO | WO-9914979 A1 | 3/1999 |
| WO | WO 99/34304 | 7/1999 |
| WO | WO-9934304 A1 | 7/1999 |
| WO | WO 01/35273 A1 | 5/2001 |

(56) References Cited

FOREIGN PATENT DOCUMENTS

| | | |
|---|---|---|
| WO | WO-0152485 A1 | 7/2001 |
| WO | WO 03/036515 A1 | 5/2003 |
| WO | WO-03036515 | 5/2003 |

OTHER PUBLICATIONS

International Search Report for PCT/US02/34673 (3 pgs.).

Menezes, A.J. et al., Handbook for Applied Cryptography, Prentice Hall, Inc., 553-561 (1997).

Hardcopy Electronic Document Exchange, www.omtool.com accessed via Wayback Machine Internet Archive, "estimated publication date" of May 12, 2002, 1 page.

Xerox DC On-ramps Work Flow, www.omtool.com accessed via Wayback Machine Internet Archive, "estimated publication date" of May 17, 2002, 1 page.

\* cited by examiner

METHODS AND APPARATUS FOR ENTERPRISE DOCUMENT DISTRIBUTION

BACKGROUND OF THE INVENTION

The invention pertains to information technology and, more particularly, to automatic electronic distribution of both paper and electronic documents. It has application, by way of example, in the routing of documents—including, for example, telefaxes, e-mail messages, spreadsheets, word processing files—within and among enterprises.

The field of electronic document distribution has traditionally been long on promise, but short on delivery. The advent of each new electronic document technology has brought the hope of easy dissemination—not only between the document's original creator and recipient, but also among subsequent recipients inside and outside an enterprise. However, the degree to which this has been achieved in practice varies widely. On one end of the spectrum is e-mail, which is built on a protocol designed for distribution and redistribution and which serves both functions well. On the other end of the spectrum are word processing and scanner technologies, both originally intended for document creation, and both which often achieve distribution only through awkward add-on or third-party solutions.

Most of the recent activity in the art has been directed toward enhancing those add-on and third-party solutions, for example, in regard to scanning. Thus, for example, so-called multifunction devices with embedded scanning allow users to scan a document to an email address or a file server directory. This functionality typically proves adequate for users who only intermittently scan a document to their desk; however, it does not address any other document management requirements the user may have, e.g., vis-a-vis the scanned document and other enterprise documents to which it relates.

A related enhancement provided by the art integrates enterprise (or other) e-mail addresses into multifunction devices, allowing users to scan documents to multiple addresses at one time and to deliver those documents in a given format (e.g., TIFF, PDF, and so forth) to those addresses. Unfortunately, these solutions tend not to integrate with the variety of widely available enterprise document repositories. Moreover, they allow distribution in only one format.

An object of the invention is to provide improved methods and apparatus for enterprise document distribution.

A further object of the invention is to provide such methods and apparatus as support both occasional and heavy use within the enterprise.

A still further object of the invention is to provide such methods and apparatus as can be readily integrated with a variety of enterprise document repositories.

Yet a still further object of the invention is to provide such methods and apparatus as are scalable and as provide the flexibility to support a range of user and enterprise needs.

SUMMARY OF THE INVENTION

The foregoing objects are among those attained by the invention which provides, in some aspects, methods for electronic document distribution that permit automatic transmittal of a set of documents to one or more recipients. The set includes documents pre-existing at the time the distribution is specified, as well as at least one that is subsequently created. Such "mixed-mode" distribution can be used, for example, to effect automatic distribution of pre-existing "electronic" documents (such as word processing documents, spreadsheets, etc.), along with a newly scanned paper document, e.g., a hand-written note. Distribution of the documents is triggered by creation of the latter document—in this example, the scanned hand-written note.

Further aspects of the invention provide methods as described above in which the set of documents is distributed to a pre-defined list of recipients. That list can be defined (e.g., by the user or system administrator) at the time the distribution itself is specified or it can be defined earlier (e.g., for use in multiple subsequent distributions). According to some practices of the invention, such a pre-defined list can be modified (e.g., added to) at the time of the distribution. The list can include, not only the recipients of each distribution, but also (in the same or a related list) the electronic destination address for each type of document that is to be forwarded thereto. These may be e-mail addresses, telefax numbers, printer addresses, local or network file system folders, document repository addresses, and so forth. Formats via which documents are transmitted to those addresses (as well as any desirable or necessary conversions) can be implicitly and/or explicitly defined, as well.

In related aspects, the invention provides methods as described above in which both the documents that make up a distribution and recipients to which those documents will be transmitted can be specified before and/or at the time the distribution itself is specified. Thus, for example, at the launch of a corporate sales initiative, a user can select a set of pre-existing electronic documents (e.g., word processing documents and spreadsheets) containing standard sales contract terms. At or around that same time, the user can select recipients (e.g., within the corporation) who will receive copies of all outgoing sales contracts. Later, in the midst of the sales push, the user can specify that a mixed-mode distribution is to be made that includes the pre-selected documents and, possibly, one or more other pre-existing documents (e.g., word processing documents specifying special sales terms). The user can, further, specify that the documents are to be transmitted to the pre-selected recipients, as well as to one or more newly identified customers or other sales targets.

According to further related aspects of the invention, at least one of the documents in the set is distributed in different formats to multiple recipients. Continuing the above example, the scanned hand-written note can be sent by e-mail in PDF format to one recipient, uploaded by sFTP protocol in TIFF format to a document repository folder of another recipient, and faxed to a third recipient.

Still yet further aspects of the invention provide such methods that include defining the list of recipients and/or their respect electronic destination addresses by way of a graphical user interface (GUI). Related aspects of the invention provide such a method in which the GUI is patterned after and/or integrated with an enterprise email application (e.g., Microsoft Outlook®).

Other aspects of the invention provide methods as described above which include execution of a workflow that is initiated by identification of a list of recipients (and/or electronic destination addresses) and of at least one pre-existing document to be included in a set of documents to be sent to those recipients. Related aspects of the invention provide such methods in which execution of the workflow includes retrieving the pre-existing documents and polling for, or awaiting signaling of, creation of the newly created document(s).

Still further aspects of the invention provide such methods as include identifying the newly created document from an identification associated therewith. This can be, for example, an ID provided on the cover page (or some other identifiable location) of the subsequently-created document. Related aspects of the invention provide such methods as include generating that ID at the time the aforementioned workflow is initiated. Continuing the example, methods according to this aspect of the invention can include generating a scanner cover sheet for prepending to the hand-written notes that are to be scanned for inclusion in the set of documents being distributed.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
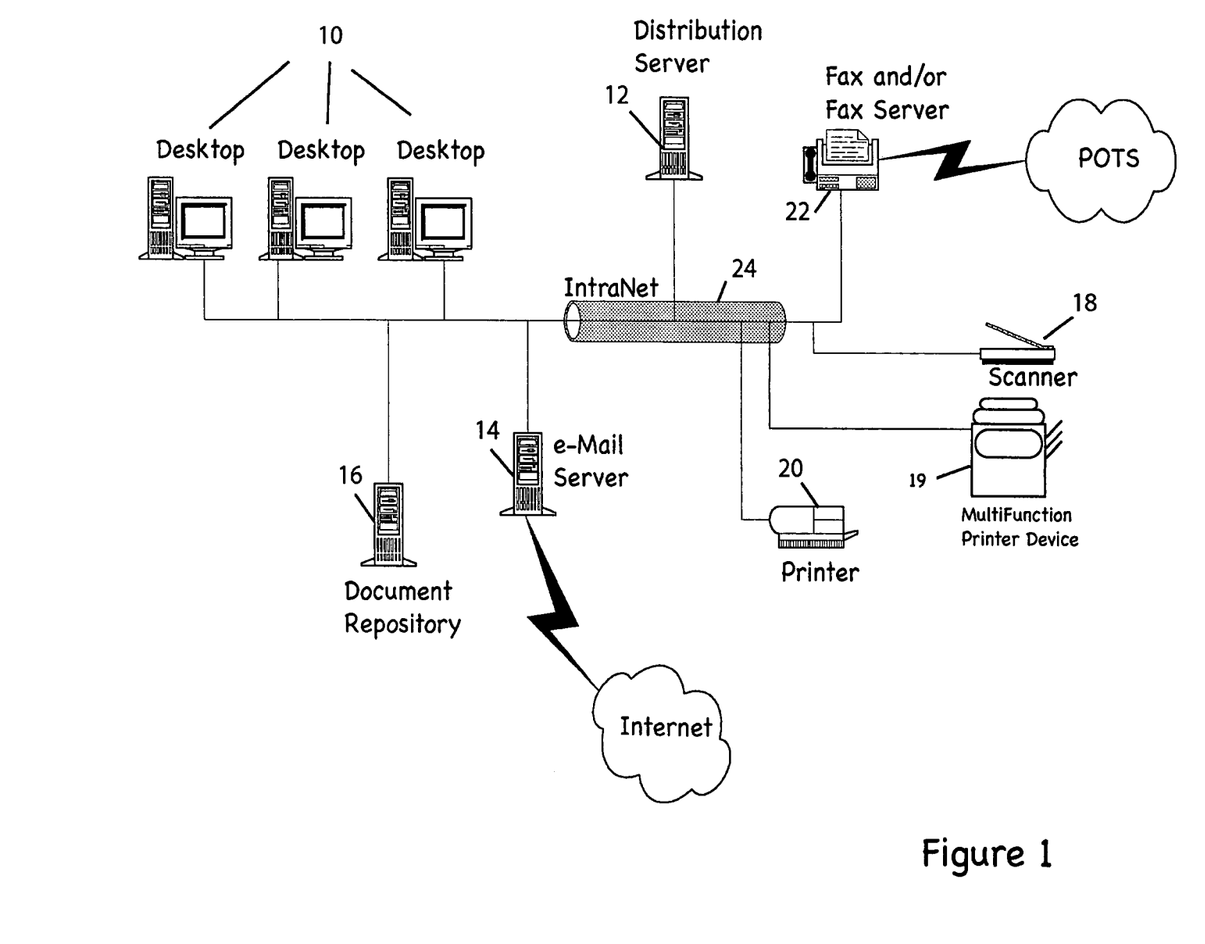
FIG. 1 depicts an enterprise digital data processing system of the type used for practice of the invention.

FIG. 1 depicts an enterprise digital data processing environment of the type used for practice of the invention. This includes a plurality of digital data devices, including client computers 10, distribution server 12, e-mail server 14, document repository 16, scanner 18, multifunction printer (MFP) device 19, printer 20 and fax/fax-server 22, all coupled by intranet 24, as shown. The illustrated configuration is just one of many in which the invention can be practiced. For example, there may be a greater or lesser number of elements than those shown here and they may be coupled for communication by peer-to-peer networks, wide area networks, the Internet, or other communications media (wired, wireless, or otherwise), or combinations thereof, of the type known in the art.

Illustrated client computers 10 comprise any of a variety of digital data processing devices used to execute client applications, such as word processors, spreadsheet programs, e-mail clients, web browsers, and any of a host of other applications available in the marketplace. In the drawing, the client computers are shown as desktop computers on a wired local area network, though they may comprise laptop computers, personal digital assistants, workstations, mainframe computers, or otherwise. Regardless, these devices are constructed and operated in the conventional manner known in the art, as adapted in accord with the teachings hereof.

Distribution server 12 comprises a digital data processor that facilitates the electronic distribution of documents to and/or from devices 10 and 14-22, among others. That digital data processor may be a desktop computer, workstation, mainframe or other computing device suitable for and adapted to operation in accord with the teachings hereof.

E-mail server 14, document repository 16, scanner 18, MFP 19, printer 20 and fax/fax-server 22 comprise conventional digital data devices and/or systems of the respective types (i.e., document repository, scanner, MFP, printer, and fax/fax-server, respectively) available in the marketplace, as adapted for operation in accord with the teachings hereof. The illustrated e-mail server, for example, may be a Microsoft Outlook/Exchange server of the type common in corporate environments. Document repository 16 may comprise any of a document management system (DMS), records management system (RMS), enterprise content management system, knowledge management system, business intelligence system, desktop computer or network computer file system, or other repository of documents. MFP 19, in some embodiments, may execute an intelligent, Java-based client (e.g., for improved support of the functionality shown in Step 55 and discussed below).

Figure 2:
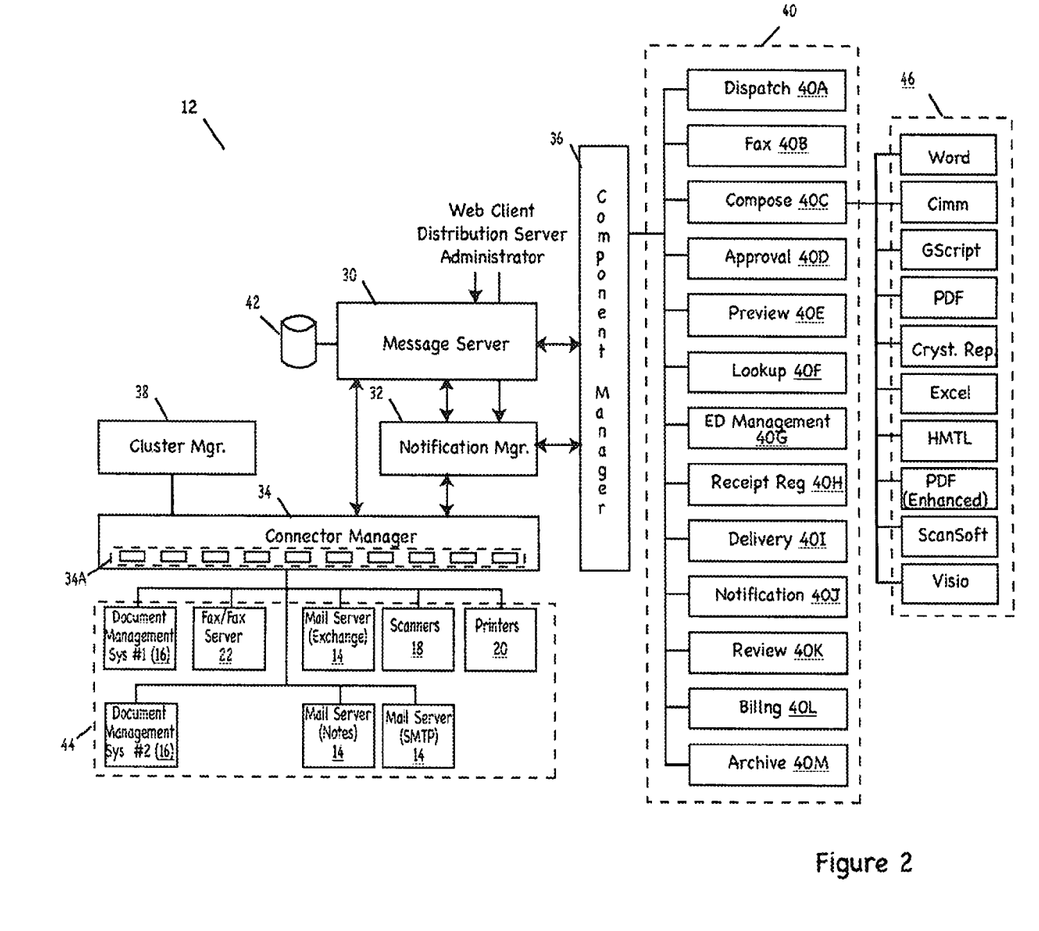
FIG. 2 depicts further details of a document distribution server of the type used in the system of FIG. 1.

FIG. 2 depicts further details of the distribution server 12 of FIG. 1. The server comprises a message server 30, a notification manager 32, a connector manager 34, a component manager 36, a cluster manager 38, and document distribution workflow processing components 40.

In the illustrated embodiment, elements 30-40 comprise software modules, e.g., objects, dynamic linked library (DLL) components, or otherwise, that execute on a single digital data processor or on multiple such devices. Those modules are coupled for communication as shown in the drawing and as otherwise evident herein. Such communication can be supported by the Windows® component object model (COM) and/or other mechanisms, whether or not object-oriented, known in the art, such as those used or useable in connection with object linking and embedding (OLE) technologies, ActiveX technologies, COM+ technologies, distributed component object model (DCOM) technologies, Microsoft's .NET framework, and common object request broker architecture (CORBA), to name just a few.

Illustrated message server 30 comprises a principal part of an engine that executes workflows for distributing documents. In this regard, the server 30 keeps track of process state and settings, both for the distribution server 12 as a whole, as well as for the individual workflows via which documents (and document sets) are distributed. State information, both for distribution server 12 and for the individual workflows, are maintained in a database and associated files, collectively shown as element 42 (though in other embodiments this information can be maintained in tables, linked lists, and so forth, in memory or otherwise). The database can be relational, or otherwise, as known in the art, and can support SQL queries or other retrieval mechanisms, again, as known in the art.

Illustrated notification manager 32 filters and routes events between the connector manager 34 and the component manager 36, as well as signaling the message server 30 of event occurrence. In the illustrated embodiment, event notifications are generated using a publish-and-subscribe model, though other embodiments may utilize other models for event distribution. Notifications to the component manager 36 include signaling the workflow processing components 40 that they have new jobs or tasks to complete.

Illustrated connector manager 34 provides a framework for execution of connectors 34A that communicate with the hardware/software 44. In the illustrated embodiment, this includes e-mail servers 14 (e.g., Notes®, Exchange® and SMTP servers), document repositories 16 (e.g., document management systems, such as Summation® legal document management system, records management systems (RMS), enterprise content management systems, knowledge management systems, business intelligence systems, desktop computer or network computer file systems, and/or other repositories of documents), scanners 18, MFPs 19, printers 20, fax and/or fax-servers 22, all of the type known in the art.

Connector manager 34 of the illustrated embodiment utilizes a plug-in architecture to facilitate addition, removal and/or reconfiguration of interfaces to the hardware/software 44. In other embodiments, similar functionality can be provided via an extension-based architecture, or otherwise. The interfaces, themselves, can comprise device drivers, DLLs, or otherwise, as known in the art for communication with the devices, subsystems, and so forth, that make up hardware/software 44.

Component manager 36 controls which workflow processing components 40 are called during the processing sequence of a workflow. In the illustrated embodiment, each state of the workflow is executed by one (or more) of the components 40. In this regard, the component manager 36, like the connector manager 34, supports a plug-in architecture to facilitate addition, removal and/or reconfiguration of such components 40—though, in other embodiments, similar functionality can be provided via an extension-based architecture, or otherwise. The components 40 of the illustrated embodiment are COM components and include a dispatch component 40A, a fax component 40B, a compose component 40C, an approval component 40D, a preview component 40E, a lookup component 40F, an embedded directive (ED) component 40G, a receipt registration component 40H, a delivery component 40I, a notification component 40J, a review component 40K, a billing component 40L, and an archive component 40M. Other embodiments may use components 40 providing other functionality instead or in addition.

The compose component 40C of the illustrated embodiment is responsible for reformatting documents that are being processed during a workflow. To this end, the component 40C includes translation modules 46 that can be used individually or in combination to effect required transformations. The modules 46 can be constructed and operated in these regards in the conventional manner known in the art of document conversion.

Optional cluster manager 38 is responsible for ensuring high availability of the server 12 functions. It achieves this by distributing and duplicating workflow processing among a plurality of digital data processors, e.g., in a manner conventional to high availability enterprise processing, as known in the art.

Figure 3:
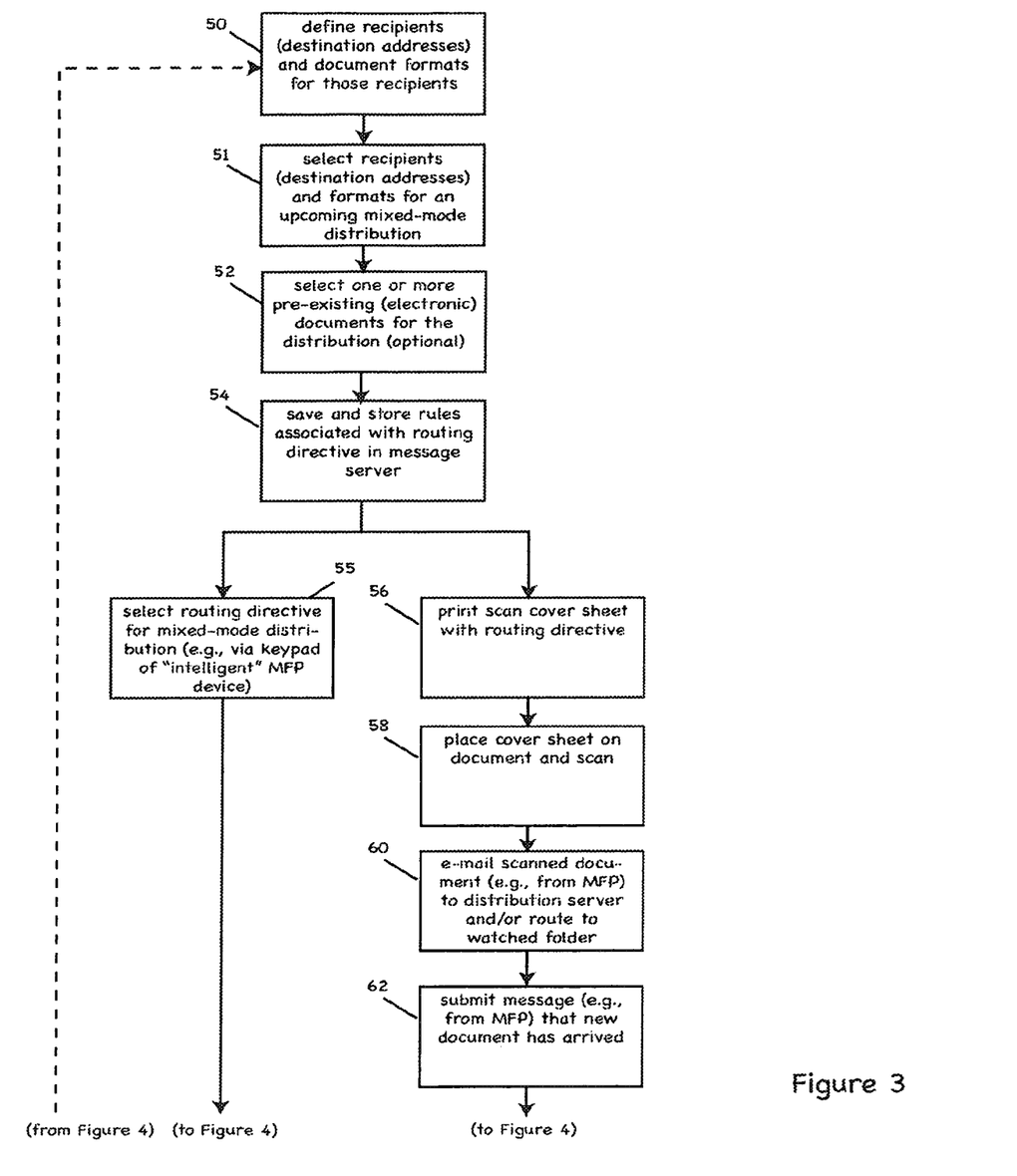
FIGS. 3-4 depict operation of the document distribution server of FIG. 2.
Figure 4:
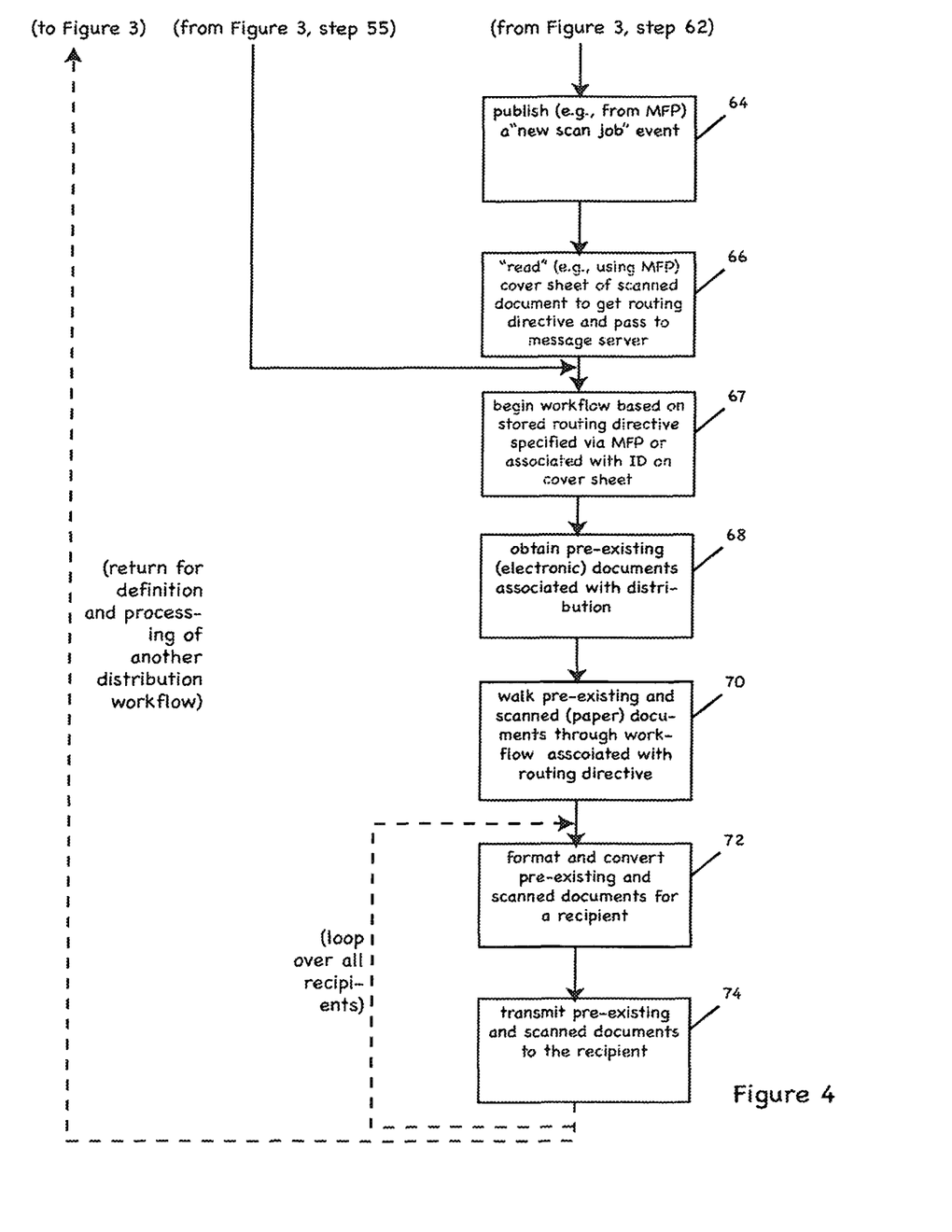

FIGS. 3 and 4 depict a method of use of the system of FIG. 1 to effect document distribution according to one practice the invention. As above, the illustrated sequence of steps is just one of many with which the invention can be practiced. Thus, it may be practiced with a greater or lesser number of steps than those shown here, ordered as shown in the drawing or otherwise.

In step 50, a user, system administrator or other defines recipients for one or more document distributions. In the illustrated embodiment, this is accomplished via interaction with the message server 30, e.g., via a web client or administrative interface, executed directly on the server 30 and/or via devices (e.g., desktop computers 10) coupled thereto, e.g., via an intranet 24, the Internet, or otherwise.

Though recipients destination addresses are typically entered interactively, they can be imported programmatically and/or via batch jobs (e.g., executed on the distribution server), including, for example, importing a list of actual or potential recipients from a Microsoft Outlook or other LDAP (lightweight directory access protocol) or mail server, a mail client, a SharePoint™ server, a contact manager, or otherwise. In preferred embodiments, an application for interactive definition of recipients provides a graphical user interface (GUI) that is modeled after and/or works in conjunction with a corporate mail client or server, such as Outlook®, though it may be modeled after and/or work in conjunction with other applications. Other interactive applications may use command line interfaces or otherwise. The recipient list can be defined at the time a distribution itself is specified (e.g., per step 51) or otherwise, e.g., earlier.

In steps 51-52, the user, system administrator or other defines a routing directive for an upcoming "mixed-mode" distribution. This includes selecting recipients, e.g., from among those defined in step 50; see step 51. It also includes selecting one or more pre-existing documents for inclusion in the distribution; see step 52.

Recipients specified in step 51 may be defined via e-mail addresses, telefax numbers, printer addresses, local or network file system folders, document repository addresses, or other electronic document destinations. One or more destinations can be specified for each recipient, indicating preferred and/or required addresses for receipt of distributed documents of specified types. Formats via which documents are transmitted to those destination addresses (and any desirable or necessary conversions) may be defined as well, e.g., where this is not otherwise obvious from or necessitated by the recipient address. By way of example, a recipient can be specified as receiving (i) pre-existing word processing documents or spreadsheets in PDF format by e-mail at a designated e-mail address, and (ii) image documents (e.g., scans) by fax at a designated fax number.

Pre-existing documents specified in step 52 may be identified by user selection (e.g., via dialog box, command line, etc.), default file selection (e.g., all documents in a specified watch folder), or otherwise. These may be word processing documents, spreadsheets, image files, or so forth. Typically, they are files stored locally to the computer, document repository or enterprise network from which the routing directive is issued, though, they may be other pre-existing documents, as well, e.g., documents from the Internet.

As above, definition of the routing directive can be accomplished via interaction with the message server 30, e.g., via a web client or administrative interface, executed directly on the server 30 and/or via devices (e.g., desktop computers 10) coupled thereto, e.g., via intranet 24, the Internet, or otherwise. And, as above, though a routing directive is typically defined interactively, it can be defined via batch jobs (e.g., executed on the message server 30), including, for example, importing one or more routing directives (e.g., encoded in comma-delimited format, XML, or otherwise) from an enterprise application (e.g., a content management system) or otherwise.

Also as above, in a preferred embodiment, an application for routing directive definition provides a graphical user interface (GUI) that is modeled after and/or works in conjunction with a corporate mail client or server, such as Outlook®, though it may be modeled after and/or work in conjunction with other applications.

In step 54, the message server 30 stores workflow rules associated with the routing directive defined in steps 51-52. In the illustrated embodiment, those rules are specified in terms of states and events, e.g., using the metaphor of a finite state machine, or the like, though in other embodiments they may be specified otherwise. The distribution server 12 also begins execution of that workflow in step 54. This can include caching copies of the pre-existing documents, e.g., to insure that copies will be available when the distribution is being readied for transmittal to the designated recipients.

In step 56, the message server 30 effects printing of a scan cover sheet for use in the mixed-mode distribution and, particularly, for inclusion in the document that is to be scanned for inclusion in the distribution. That cover sheet can include human-readable text identifying the distribution (e.g., by name, ID, and/or other code) as well, optionally, as the documents it (the distribution) includes and/or the recipients to which it is directed. It can include, instead and/or in addition, machine-readable codes (e.g., bar codes) with some or all of this information. In some embodiments, the ID printed on the cover sheet (in text or otherwise) is a unique ID sufficient to identify the distribution and to distinguish it from any other distributions known to the distribution server 12.

In step 58, the user places the cover sheet printed in step 56 on the document that is to be scanned and performs the scan. This can be accomplished on any scanner 18, MFP 19 (intelligent or otherwise) or other suitable device that is coupled to the distribution server 12 and/or that can signal (or upload files to) the server as described below.

In step 60, the scanner 18 (or MFP 19) signals the distribution server 12 of the newly scanned document and/or uploads (or stores) that document to a specified location that is watched by the notification manager. Such signaling and/or uploading can be accomplished via directives programmed into the scanner 18 (or MFP 19), e.g., specifying that all scanned documents (or, at least, certain user-designated ones) are to be (i) stored to a specified "watch" location associated with the distribution server 12 and/or (ii) e-mailed to an address associated with that server.

In step 62, the connector manager 34 (or another element of the distribution server 12) responds to signaling from the scanner 18 (or MFP 19) and/or to detection of a newly scanned document by notifying message server 30 that a new scan has been created.

In step 64, the message server 30 responds to notification from the connector manager 34 by publishing a "new scan job" event via the notification server 32. Of course, in other embodiments, the nature of that event may vary and/or it may be published by another element (e.g., the message server 30 itself).

In step 66, the component manager 36 responds to the event publication by invoking one of the components 40 to "read" the human-readable text or machine-readable codes on the scanned document cover sheet to discern the ID of the routing directive or, in some embodiments, to discern the directive itself. In the case of human-readable text, the component manager can, for example, invoke the compose component 40C and its associated enhanced PDF module to perform optical character recognition (OCR) on the cover sheet. In the case of machine-readable codes, the component manager can invoke a bar code-reading component (not shown), or the like. In the illustrated embodiment, the component manager 36 passes the routing directive and/or its ID to the message server 30 for matching up with the workflow whose execution was begun in step 54.

Instead of, or in addition to, discerning the routing directive from the scanned document cover sheet, some embodiments (alternatively or additionally) permit the user to enter that directive—e.g., via an intelligent MFP 19 (of the type running a Java-based or other client), or other suitable device—in connection with scanning the paper document. This is illustrated by the parallel flow path commencing at step 55 in the drawing. In this mode of operation, the user keys into the MFP 19 (or other device), or otherwise selects (e.g., using a touch screen), the particular routing directive defined in steps 51-52 for the current distribution (e.g., as opposed to that defined for other distributions). That directive (or an ID or code representative thereof) can be communicated (or otherwise made available) to the MFP 19 (or scanner 19) by the connector manager 34 or otherwise, e.g., to facilitate such display to, and selection by, the user. In the foregoing regard, those skilled in the art will appreciate that, whereas an intelligent MFP is desirable for execution of the functionality of step 55, such a device is not required for execution of the functionality of steps 60-66.

Regardless, in step 67, the workflow begins based on the routing directive ID discerned from the scanned document cover sheet per step 66 or selected/keyed-in per step 55. In step 68, the component manager 36 (operating in cooperation with the message server 30) obtains the pre-existing documents that were specified for inclusion in the distribution and that were, for example, cached in step 54.

In steps 70-74, the component manager walks the pre-existing document(s) and the scanned document that make up the distribution through workflow rules associated with the routing directive. This includes formatting and/or converting the documents as required for each recipient; see, step 72. This also includes transmitting the formatted and/or converted documents for the specified destinations. As indicated by the inner-loop dashed line in the drawing, the component manager repeats this for each document that makes up the distribution.

As a consequence of each document being processed separately, in steps 70-74, and the possibility of multiple destination addresses having been provided for each recipient, in step 50, some of the documents in the distribution may be transmitted in different formats to multiple recipients. For example, a scanned hand-written note that is included in the distribution may be sent by e-mail in PDF format to one recipient, uploaded by sFTP protocol in TIFF format to a document repository folder of another recipient, and faxed to a third recipient.

Following step 74, the distribution manager returns, e.g., to step 50, for definition and processing of another workflow.

Described above are methods and apparatus meeting the objects set forth above, among others. It will be appreciated that the embodiments described herein are merely examples of the invention and that other embodiments, incorporating variations on those described here, fall within the scope of the invention. Thus, by way of example, it will be appreciated that one or more of the elements (and steps) shown in the drawings and discussed above may be eliminated, combined and/or supplemented with other elements (and steps)—and that the interconnection of the elements (and steps) may vary.

In view thereof, what we claim is:

1. A method for automated electronic document distribution, comprising:
   receiving, by a processor of a computing device, a routing directive for the one or more document distributions, wherein receiving the routing directive comprises:
      receiving, by the processor, a selection from among one or more pre-existing electronic documents for inclusion in one or more document distributions, a selection of one or more recipients for the one or more document distributions, and a selection of a document format individually specified for each recipient, wherein each document format identifies the format of documents to be sent to the respective recipient such that the document format may be different among the recipients;
   generating, by the processor, a document distribution workflow comprising an instruction set for performing the one or more document distributions based at least in part on the routing directive;
   storing, by the processor, the instruction set;
   providing, by the processor, the scan cover sheet, wherein the scan cover sheet identifies the document distribution workflow;
   receiving, by the processor, one or more scanned documents and the scan cover sheet from a scanning device;
   identifying, by the processor, from the scan cover sheet received from the scanning device, the document distribution workflow;

executing, by the processor, the instruction set associated with the document distribution workflow, wherein executing the instruction set comprises:
    transmitting, by the processor, the selected one or more pre-existing electronic documents, the one or more scanned documents and the scan cover sheet to the one or more recipients in accordance with the document distribution workflow, where such distribution is triggered by receipt of the one or more scanned documents.

2. The method of claim 1, wherein the one or more pre-existing electronic documents, the one or more scanned documents and the scan cover sheet are transmitted to the one or more recipients upon creation of the one or more scanned documents.

3. The method of claim 1, where at least one of the one or more pre-existing electronic documents, the one or more scanned documents and the scan cover sheet are transmitted in different formats to at least two of the recipients.

4. The method of claim 3, wherein the one or more pre-existing electronic documents are transmitted in any of word processing, spreadsheet, portable document, image, telefax and e-mail formats to the one or more recipients.

5. The method of claim 1, comprising:
    providing, on a graphical user interface, a list of one or more recipients for the document distribution for selection by a user.

6. The method of claim 5, wherein the graphical user interface is at least one of (i) patterned after an enterprise e-mail program and (ii) integrated with an enterprise e-mail program.

7. The method of claim 1, wherein the one or more pre-existing electronic documents and the scan cover sheet are transmitted to at least one member selected from the group consisting of a printer, e-mail address, telefax, local or network file system folder, and document store.

8. The method of claim 1, wherein the routing directive is text or a machine readable code.

9. The method of claim 1, wherein the routing directive is a machine readable code and the machine readable code is a bar code.

10. A system for automated electronic document distribution, comprising:
    a memory;
    a processor configured to process data to provide automated electronic document distribution, wherein the processor is configured to execute instructions to:
        receive a routing directive for the one or more document distributions, wherein receiving the routing directive comprises:
            receiving a selection from among one or more pre-existing electronic documents for inclusion in one or more document distributions, a selection of one or more recipients for the one or more document distributions, and a selection of a document format individually specified for each recipient, wherein each document format identifies the format of documents to be sent to the respective recipient such that the document format may be different among the said recipients;
        generate a document distribution workflow comprising an instruction set for performing the one or more document distributions based at least in part on the routing directive;
        store the instruction set;
        provide the scan cover sheet, wherein the scan cover sheet identifies the document distribution workflow;
        receive one or more scanned documents and the scan cover sheet from a scanning device;
        identify, from the scan cover sheet received from the scanning device, the document distribution workflow;
        execute the instruction set associated with the document distribution workflow, wherein executing the instruction set comprises:
            transmitting the selected one or more pre-existing electronic documents, the one or more scanned documents and the scan cover sheet to the one or more recipient destinations in accordance with the document distribution workflow, where such distribution is triggered by receipt of the one or more scanned documents.

11. The system of claim 10, where at least one of the pre-existing documents, the one or more scanned documents and the scan cover sheet are transmitted in different formats to at least two of the recipient destinations.

12. The system of claim 11, wherein the one or more pre-existing documents, the one or more scanned documents and the scan cover sheet are transmitted in any of word processing, spreadsheet, portable document, image, telefax and e-mail formats to the one or more recipients.

13. The system of claim 10, wherein the instructions cause the processor to provide, on a graphical user interface, a list of one or more recipients for the document distribution.

14. The system of claim 13, wherein the graphical user interface is at least one of (i) patterned after an enterprise e-mail program and (ii) integrated with an enterprise e-mail program.

15. The system of claim 10, wherein the one or more pre-existing electronic documents and the scan cover sheet are transmitted to any of a printer, e-mail address, telefax, and document store.

16. The system of claim 10, wherein the routing directive is text or a machine readable code.

17. The system of claim 10, wherein the routing directive is a machine readable code and the machine readable code is a bar code.

* * * * *